(12) United States Patent
Schrötz et al.

(10) Patent No.: US 6,410,658 B1
(45) Date of Patent: Jun. 25, 2002

(54) POLYEPOXIDE/POLYETHER MONO- OR POLYAMINE PRECURSOR REACTED WITH MONO- OR POLYAMINE, EPOXY RESIN-AMINE ADDUCT AND MONOEPOXIDE-AMINE ADDUCT

(75) Inventors: Markus Schrötz, Oberhausen; Martin Fulgraff, Herne; Peter Martischewski; Jurgen Schillgalies, both of Moers; Rolf Herzog, Bottrop, all of (DE)

(73) Assignee: Bakelite AG (DE)

( * ) Notice: Subject to any disclaimer, the term of this patent is extended or adjusted under 35 U.S.C. 154(b) by 0 days.

(21) Appl. No.: 09/813,179

(22) Filed: May 9, 2001

(30) Foreign Application Priority Data

Mar. 23, 2000 (DE) .......................... 100 13 735

(51) Int. Cl.$^7$ .......................... C08G 59/14; C08K 3/20; C08L 63/02
(52) U.S. Cl. .......................... 525/526; 523/404; 525/486
(58) Field of Search .......................... 523/404; 525/526, 525/486

(56) References Cited

U.S. PATENT DOCUMENTS

| | | | | |
|---|---|---|---|---|
| 3,963,666 A | * | 6/1976 | Schreiber et al. | 523/404 |
| 5,032,629 A | | 7/1991 | Hansen et al. | 523/414 |
| 5,350,784 A | * | 9/1994 | Darwen et al. | 524/404 |
| 5,599,855 A | * | 2/1997 | Walker | 523/404 |
| 5,959,061 A | | 9/1999 | Neumann et al. | 528/119 |
| 6,077,884 A | | 6/2000 | Hess et al. | 523/417 |

FOREIGN PATENT DOCUMENTS

| WO | 9312187 | 6/1993 |
|---|---|---|
| WO | 9731963 | 9/1997 |

\* cited by examiner

*Primary Examiner*—Robert E. L. Sellers
(74) *Attorney, Agent, or Firm*—Bierman, Muserlian and Lucas

(57) ABSTRACT

A curing agent for epoxy resin comprises:

a) a reaction product of at least one polyalkylene polyether monoamine and/or polyamine with a polyepoxide and, optionally, a monoepoxide to obtain an epoxide group-containing precursor, the precursor further reacted with a primary monoamine and/or a primary or secondary polyamine in at least a 10% molar excess relative to the epoxide groups of the precursor, the reaction product being substantially free of non-reacted amines;

b) an amine-terminated adduct of an epoxy resin and a primary monoamine and/or a primary or secondary polyamine being substantially free of non-reacted amines; and c) an amine-terminated adduct of an epoxide group-containing reactive thinning agent and a primary monoamine and/or a primary or secondary polyamine being substantially free of non-reacted amines.

7 Claims, No Drawings

POLYEPOXIDE/POLYETHER MONO- OR POLYAMINE PRECURSOR REACTED WITH MONO- OR POLYAMINE, EPOXY RESIN-AMINE ADDUCT AND MONOEPOXIDE-AMINE ADDUCT

The invention relates to curing agents for epoxide compounds, which are emulsifiable and/or soluble in water and which are preferably employed in the production of aqueous epoxy resin emulsions or dispersions.

From EP-B 0 387 418 are known water-emulsifiable curing agents for epoxy resins, which, at good property profiles of the cured products have low viscosity, bright color and good emulsifying effects. These curing agents are produced by conversion of polyalkylene polyether monoamines and/or diamines and/or polyamines with an average molecular weight of 148 to 5000, with di- and/or polyepoxide compounds, if appropriate after reaction or in mixture with monoepoxide compounds, conversion of the thus obtained epoxide group-containing precursor with a primary or secondary mono- and/or di- and/or polyamine, wherein the secondary amine has at least two secondary amino groups and the amine or amine mixture is used in such quantities that the reaction-capable epoxide groups have a ratio of 1:2 to 1:10 to the hydrogen atoms on the nitrogen. But they still have various shortcomings: due to their content of free amine, they tend to discolor and readily form carbamates, which becomes noticeable during their application in coating means by their degraded interlayer adhesion. But especially in the emulsion with water and epoxy liquid resin they do not indicate the end of the spreadable or workable life. But precisely this property is highly important since it eliminates erroneous application.

This indication of the workable life is to be understood as follows: an aqueous emulsion applied on a substrate dries. Therein the emulsion and the remaining droplets of the nonaqueous phase, which ideally contains resin and curing agent in the proper mixing proportions, form a film before the film is chemically cured. The time interval between the production of the emulsion and that point in time, starting at which films can no longer be formed from the emulsion, or films are formed which are defective in their properties, is known as the workable life. This workable life can in certain cases be shorter than the processing time, i.e. that time in which the emulsion can be applied onto a substrate. It is therefore advantageous, if a binding means systems indicates the end of the workable life thereby)that at the end of the workable life, the viscosity of the emulsion already increases so strongly that processing is no longer possible.

Water-emulsifiable curing agents for epoxy resins, which have a workable life indication, are known from EP-A 0 821 021. These are reaction products of aliphatic polyols with epoxy resins, which are subsequently converted with polyamines. The reaction of polyols with resins only takes place at markedly increased temperature under catalysis. Through the homopolymerization of the resin, products are generated with increased viscosity and the resin must be used in large excess quantities. This degrades the emulsifiability of the correspondingly produced adducts.

It is therefore the task of the invention to provide water-emulsifiable curing agents for epoxy resins which have the same good property profile as the curing agents known from EP-B 0 387 418, but which indicate the end of the workable life. It is furthermore a task of the invention to provide such curing agents substantially free of low-molecular amines, but which, nevertheless, are not dark in color and which are thus also suitable for the production of white coatings.

The solution of the task takes place through curing agents according to claims 1 to 4 and through processes for their production according to claims 5 to 7. These curing agents are suitable, in particular together with one or several epoxide compounds and water as well as, if appropriate, fillers and additives, such as for example pigments, antifoaming agents or deaerating agents, for the production of lacquers and varnishes, coatings and covering layers, as well as as additives for hydraulic binding agents. These curing agents are further suitable, in particular together with one or several epoxide compounds as well as, if appropriate, fillers and additives, such as for example, pigments, defoaming agents or deaerating agents for the production of sealing and adhesion substances as well as of flexible preforms, sheet materials and laminates and are used as lacquers, varnishes, coatings, coverings and additives for hydraulic binding agents.

Since in the production of the curing agents according to EP-B 0 387 418 in the second reaction step only the complete conversion of the epoxide groups with amino groups and not a curing reaction is desired, the second conversion must take place at a molar amine excess. The curing agents, consequently, comprise free amines which lead to the properties which were listed in the introduction as being undesirable. It has been found that these non-converted amines can be removed from the reaction mixture by distillation, without the previously favorable properties of the amine-free curing agents being degraded if, for the second reaction step, amines are used which can be distilled without decomposition. This distillation is technically not simple since the reaction mixture must be heated to relatively high temperatures and, moreover, foams intensely during distillation under vacuum. It is, in particular, surprising that in this separation of the amines by distillation only minimum discolorations occur of the curing agents remaining as residue in the distillation and substantially free of primary or secondary mono- and/or di- and/or polyamines, and that through this process step the important property of workable life indication is attained.

But this product by itself is not suitable as curing means for water-emulsifiable epoxy resin systems since, due to the high content of alkylpropylene oxide units, coatings are formed whose water resistance does not meet quality requirements. Moreover, for the same reason, through-curing is considerably delayed and the final strength of the films is too low.

It was found that these disadvantages are overcome if the curing means, in addition to these conversion products (component a), comprise the following components:
the amine-terminal adduct of an epoxy resin and a primary or secondary mono- and/or di- and/or polyamine, wherein the secondary amine has at least two secondary amino groups and the adduct is substantially free of non-converted amines (component b), and the amine-terminal adduct of a reactive thinning agent and a primary or secondary mono- and/or di- and/or polyamine, wherein the secondary amine has at least two secondary amino groups and the adduct is substantially free of non-converted amines (component c).

These three components a, b and c, in the curing means according to the invention are comprised in a weight ratio of 10–60:5–85:5–85.

Consequently, curing agents having a substantially improved property spectrum are obtained through the distillation of the excess, non-converted mono-, di- or polyamines following the synthesis of the emulsifying agent component a, and through the combination with at least two different epoxide-amine adducts, also freed by distillation of nonconverted mono-, di- or polyamines. These are curing agents which in their aqueous emulsion with epoxy liquid resins are resistant to alkali, have low viscosity, inherent light color, and low toxic potential, which do not tend to form carbamate, which can be emulsified in water simply with tools appropriate to building sites, and which, in mixtures with the corresponding stoichiometric proportions of epoxy resins and, if appropriate, reactive thinning agents and water, preferably with a water content of 40–60% relative to the organic substance, cure rapidly even at low temperatures, wherein the corresponding emulsions have a clearly detectable workable life end and the cured coatings are water-resistant, bright and exhibit a low degree of yellowing.

The curing means show a very high reactivity:with corresponding short workable lives. They are therefore only suitable for use in processing methods by machine, in which short processing times are permitted or even desired. The reactivity of the curing means must be appropriately reduced for manual processing methods. This is attained thereby that the curing means are additionally converted with up to 50 mol%, relative to the amino groups, of reactive thinning agents.

It was furthermore found that, if in the production of curing means analogous to those known from EP-B 0 387 418, in the first conversion as polyalkylene polyether amines are also used polyalkylene polyether monoamines and/or diamines and/or polyamines based on ethylene oxide (polyethylene polyether amines) as well as also polyalkylene polyether monoamines and/or diamines and/or polyamines based on propylene oxide (polypropylene polyether amines) and/or polyalkylene polyether monoamines and/or diamines and/or polyamines based on butylene oxide (polybutylene polyether amines), the resulting curing means in emulsions with epoxy resins, in particular in filled systems, have significantly improved brightness after curing. It is therein insignificant whether these polybutylene polyether, polypropylene polyether, and/or polyethylene polyether amines are converted sequentially with the epoxide compounds or are previously mixed with one another.

Conversion with the di- and/or polyepoxide compounds, which, if appropriate, can also take place after the reaction or in mixtures with monoepoxides, is conducted with the methods known from EP-B 0 387 418, as a rule by conversion of the co-reactants with one another at temperatures in the range from 20 to 120° C., preferably in the range from 50 to 90° C. and by maintaining the reaction mixture for approximately 1–5 h at a temperature in this range. Separation by distillation of the amines, not converted in the second reaction step, takes subsequently place.

The quantitative ratio of the sum of the polyalkylene ether amines to the di- and/or polyepoxide compounds is selected such that the obtained products comprise at least one free epoxide group per molecule, i.e. the quantity of epoxide compounds with more than one epoxide group per molecule is selected such that the ratio of the hydrogen atoms bound to nitrogen, which possibly remain after the conversion with monoepoxide compounds and which are capable of reacting with epoxide groups, to the epoxide groups of di- or polyepoxide compounds is in the range from 1:1.4 to 6.

As the amine components for this first reaction step serve commercially available polyalkylene polyether monoamines and/or diamines and/or polyamines, preferably such based on ethylene oxide (polyethylene polyether amines) and based on propylene oxide (polypropylene polyether amines). These polyalkylene polyether amines have average molecular weights of 148 to 5000, preferably between 400 and 2000. The quantitative ratio of the polyethylene polyether amines to the polypropylene polyether amines are each in the range of 5:95 to 95:5. To this can be added up to 10% polybutylene polyether amines. Since polyethylene polyether amines are more hydrophilic than polypropylene polyether amines and polybutylene polyether amines, it is possible, through the purposeful and specific combination in suitable mixing ratios of the different polyalkylene polyether amines to adjust the HLB value of the curing means obtained after mixing the components a, b, and c as well as, if appropriate, further compounds, to react with preferably monofunctional epoxide compounds such that at different quantitative ratios of the individual components an optimum over wide ranges is attained with respect to emulsifiability and water resistance of the cured coating.

As epoxide components for the first reaction step, as well as for the production of component b, serve primarily epoxide compounds with more than one epoxide group per molecule. To diminish the amine functionality of the polyalkylene polyether amines, epoxide compounds can additionally be used having only one epoxide group per molecule unit.

These are aliphatic, araliphatic, cycloaliphatic, aromatic or heteroaromatics-comprising compounds with one epoxide group per molecule. These products are referred to as so-called reactive thinning agents.

Examples of these are butyl-, hexyl-, phenyl-, butyl phenyl- or cresyl glycidyl ethers. But other monoglycidyl compounds can also be used, such as glycidyl esters, amines, -thioethers, -amides, -(iso)cyanates, aralkylene oxides and glycidylated fatty alcohols.

Of the large number of polyfunctional epoxide compounds comprising more than one 1,2-epoxide group in the molecule, will be listed: the epoxides of polyunsaturated hydrocarbons (vinyl cyclohexene, dicyclopentadiene, cyclohexadiene, cyclododecadiene, cyclododecatriene, isoprene, 1,5-hexadiene, butadiene, polybutadienes, divinylbenzenes and the like), oligomers of epichlorohydrin and the like, epoxide ethers of multivalent alcohols (ethylene-, propylene- and butylene glycols, polyglycols, thiodiglycols, glycerine, trimethylol propane, pentaerythritol, sorbitol, polyvinyl alcohol, polyallyl alcohol and the like), epoxide ethers of multivalent phenols (resorcine, hydroquinone, bis-(4-hydroxyphenyl)-methane, bis-(4-hydroxy-3-methylphenyl)-methane, bis-(4-hydroxy-3,5-dibromophenyl)-methane, bis(4-hydroxy-3,5 difluorophenyl)-methane, 1,1-bis-(4-hydroxyphenyl)-ethane, 2,2-bis-(4-hydroxy-phenyl)-propane, 2,2-bis-(4-hydroxy-3-methylphenyl)-propane, 2,2-bis-(4 hydroxy-3-chlorophenyl)-propane, 2,2-bis-(4-hydroxy-3,5-dichlorophenyl)-propane, 2,2-bis-(4-hydroxy-3,5-dichlorophenyl)-propane, bis-(4-hydroxyphenyl)-phenyl methane, bis-(4-hydroxyphenyl)-diphenyl methane, bis-(4-hydroxyphenyl)-4'-methylphenyl methane, 1,1-bis-(4-hydroxyphenyl)-2,2,2-trichloroethane, bis-(4-hydroxyphenyl)-(4-chlorophenyl)-methane, 1,1-bis-(4-hydroxyphenyl)-cyclohexane, bis-(4-hydroxyphenyl)-cyclohexylmethane, 4,4'-dihydroxydiphenyl, 2,2'-dihydroxy diphenyl, 4,4'-dihydroxydiphenylsulfone as well as their hydroxy ethylethers, phenol formaldehyde condensation products, such as phenol alcohols, phenol aldehyde resins and the like, S and N-containing epoxides, (N,N'-diglycidyl aniline, N,N'-dimethyldiglycidyl-4,4-diamino diphenyl methane) as well as epoxides which have been produced from polyunsaturated carboxylic acids or monounsaturated carboxylic acid esters of unsaturated alcohols, glydicyl esters, polyglycidyl esters, which can be obtained by polymerization or mixed polymerization of glycidyl esters of unsaturated acids or from other acidic compounds (cyanuric acid, diglycidyl sulfide, cyclic trimethylene trisulfone or their derivatives and the like).

Preferred epoxide compounds are polyphenol glycidyl ethers liquid and solid at ambient temperature, for example the reaction products of epichlorohydrin and bisphenol A or bisphenol F. Such epoxy resins have an epoxy equivalent of 160–700. The above polyfunctional epoxide compounds, this expression also includes the term epoxy resin, can be converted according to the present method alone or mixed, if appropriate in the presence of solvents. They can also, as already discussed above, be used in mixtures with monoepoxides.

As amine components for the second reaction step, as well as for the production of components b and c, serve commercially available low-molecular monoamines, diamines, and polyamines, which can each be used alone or mixed with one another.

The selection of amines and their mixtures can take place as desired within broad ranges. However, participating in the conversion must be amines with at least one primary amino group or, when using secondary amines, such with at least two secondary amino groups, in order to ensure that the desired end product has at least one free primary or secondary amino group per molecule. In addition, it must be possible to distill these amines without decomposition occurring.

Examples of monoamines are therefore butylamine, cyclohexylamine, aniline or benzylamine, while secondary monoamines at best are used in excess relative to functional groups (epoxide groups) to reduce the functionality of the precursor, to decrease the viscosity or, if appropriate, to introduce catalytic groups.

As di- and polyamines can be used aliphatic, araliphatic, cycloliphatic, aromatic or heterocyclic di- and/or polyamines, which can be distilled without decomposition.

Examples are: ethylene diamine, diethylene triamine, triethylene tetramine, tetraethylene pentamine, 1,2-diamino propane, 1,3-diamino propane, 1,2-, 1,3- and 1,4-diamino butane, 3-(2-aminoethyl)-aminopropyl amine, N,N'-bis(3-aminopropyl)-ethylene diamine, 1,2-diaminocyclohexane, 1,3-diaminocyclohexane, 1,4-diaminocyclo-hexane, N-amino ethyl piperazine, N-aminopropyl piperazine, N-aminobutyl piperazine, phenylene diamines, xylylene diamines and isophorone diamine or mixtures of these amines. The quantity of the amine or amine mixture to be used should be proportioned such that they are used at least in a 10% molar excess relative to the epoxide groups of the precursor. This excess can be unlimited for reasons of chemical consideration. But since the excess amines must again be distilled off, for reasons of economics it is advisable to limit the excess. In general, the amines are therefore used in a 10 to 100% molar excess relative to the epoxide groups of the precursor.

The second reaction step takes place such that the product obtained in the first reaction step is mixed directly with the selected amine or amine mixture and is treated for several hours (1–5 h) at a temperature in the range from 20 to 120° C., in particular in the range from 50 to 90° C. Subsequently, the free, non-converted amines are separated by distillation, preferably under vacuum.

The production of the amine-terminal adducts of an epoxy resin and a primary or secondary mono- and/or di- and/or polyamine takes place in a manner known per se by conversion of the corresponding products with one another. As the epoxy resin can therein be used all previously listed epoxide compounds with more than one epoxide group per molecule and, as the amine component, all previously listed low-molecular di- and polyamines such as aliphatic, araliphatic, cycloaliphatic, aromatic or heterocyclic di- and/or polyamines can be used, which can be distilled without decomposition. Here also the amines are used at least in a 10% molar excess relative to the epoxide groups of the epoxy resins employed. For chemical considerations this excess can be unlimited. But since the excess amines must again be distilled off, it is advisable for economic reason, to limit the excess. In general, the amines are therefore used in a 10 to 100% molar excess relative to the epoxide groups of the epoxy resins employed.

The production of the amine-terminal adducts from a reactive thinning agent and a primary or secondary mono- and/or di- and/or polyamine also takes place in a manner known per se by conversion of the corresponding products with one another. As reactive thinning agents can therein serve all previously listed epoxide compounds with one epoxide group per molecule, such as aliphatic, araliphatic, cycloaliphatic, aromatic or heteroaromatics-containing compounds with one epoxide group per molecule. Examples are butyl, hexyl, phenyl, cresyl, butylphenyl or nonylphenyl glycidyl ethers. But other monoglycidyl compounds can also be used such as glycidyl esters, -amines, -thioethers, -amides, -(iso)cyanates and aralkylene oxides as well as monofunctional glycidylated fatty acids, glycidylated fatty alcohols or also polyfunctional reactive thinning agents such as glycidyl ethers based on multivalent alcohols such as butanediol, hexanediol, pentaerythritol or trimethylol propane. As the amine component can also be used for component c all previously listed low-molecular di- and polyamines such as aliphatic, araliphatic, cycloaliphatic, aromatic or heterocyclic di- and/or polyamines which can be distilled without decomposition. The amines are here also used in a 10% molar excess relative to the epoxide groups of the epoxy resins used. For chemical considerations this excess can be unlimited. But since the excess amines must again be distilled off, it is advisable for economic reason, to limit the excess. In general, the amines are therefore used in a 10 to 100% molar excess relative to the epoxide groups of the epoxy resins employed.

The curing agent components a, b and c according to the invention can each be produced separately and, after completed production, can be mixed with one another for the final curing agent formulation. But the curing means according to the invention can also be produced such that components a, b and c are mixed each with their fractions of excess amines and, subsequently, the nonconverted mono-, di- or polyamines, can be separated by distillation from the mixture. If for a and b the same epoxide compound is used, this can be presented at the beginning in its entire quantity.

A further simplification of the production of the curing means according to the invention can be attained thereby that, after the production of the precursor of component a, the epoxy resins for component b and the reactive thinning agents for component c are added to the precursor and the sum of all mono-, di- and/or polyamines to be used and the last conversion as well as also the processing by distillation of all three components takes place jointly.

The amine-terminal curing means produced according to the invention, which are present as an emulsion or a solution, are mixed, if appropriate, with additional reactive curing agent components, commercially available auxiliary agents, such as, for example fillers, pigments, flow improving agents, antifoaming agents, deaerating agents, etc. as well as further substances known as auxiliary agents for curing means for epoxy resins, such as for example solvents, accelerators, etc. with epoxide compounds, in particular epoxy resins with at least two epoxide groups per molecule unit in equimolar ratios of amino and epbxide groups and, if appropriate, after the addition of water and while being agitated intensively are dispersed or emulsified, applied as emulsions or dispersions and allowed to cure.

Depending on the requirements, the curing takes place at low temperatures down to approximately 0° C. within 3 to 72 hours after the mixing or at increased temperatures.

The curing means produced thus are subsequently diluted with water if they are intended to be used in water-emulsifiable systems. If appropriate, a quantity of monofunctional reactive thinning agents is also added in order to adjust the reactivity of the system by blocking primary amino groups. The quantity depends on the desired reactivity (workable life) and the targeted HLB value of the curing means. Subsequently follows again dilution with water, such that an emulsion and/or solution with a water content of preferably 40% is obtained. Such emulsions are in particular suitable for the production of sealings or primers as well as for decorative finishing coatings based on epoxy resins.

To the curing means according to the invention can be added further epoxy resin curing agents, known per se, in particular amine-terminal polyalkyl ethers, primary long-chain monoamines or amine-terminal butadiene-acrylonitrile copolymerisates as well as metal complex compounds. As a rule, these curing agent mixtures are also emulsifiable in water.

The curing means according to the invention and the curing agent mixtures comprising them can, furthermore, be combined in a manner known pe se with additional conventional additives, accelerators, and reaction retarding agents. Such curing agent mixtures can also be emulsified in water.

EXAMPLES

Quantitative specifications in the examples are each given in parts by weight.

The abbreviation AT signifies ambient temperature.

The abbreviation equ. signifies equivalent.

Example 1
Production of the Emulsifier Component

To 130 parts of a bisphenol F diglycidyl ether with an epoxy equivalent of 172 g/equivalent (Rütapox® 0161), heated to 100° C., are added under intensive agitation and over a period of 2 hours 94 parts polyalkylene polyether monoamine based on ethylene oxide with an average molecular weight of 1000 (Jeffamine® M-1000) and 57 parts polyalkylene polyether monoamine based on propylene oxide with an average molecular weight of 600 (Jeffamine® M-600) (molar ratio epoxy:amine of 2:1). After a reaction time of 2 hours at 100° C. this precursor is added over a period of 2 hours under nitrogen and intensive agitation to 110 parts of triethylene tetramine and converted for 2 hours at 80° C. (ratio of epoxy : amine=1:2 mol or 1:12 equivalents). The reaction mixture is subsequently slowly heated to 250° C. under vacuum and the nonconverted triethylene tetramine is distilled off. Obtained is a product having a viscosity at 25° C. of 30000 mPas, an amine equivalent of 179 g/equ. and a Gardner color number <3.

Example 2
Production of the Epoxy Resin Adduct

To 145 parts of triethylene tetramine (TETA) are added over a period of 2 h at 80° C. 85.2 parts of bisphenol F diglycidyl ether with an epoxy equivalent of 172 (Rütapox® 0161) (ratio of epoxy:amine:1:2 mol or 1:12 equivalents). The secondary reaction takes place for 2 h at 80° C. The distillation of the excess amine subsequently takes place at 250° C. and 50 mbar. The obtained final product has a viscosity at 80° C. of 10000 mPas, an amine equivalent of 64 g/equ. and a color number according to Gardner of <3.

Example 3
Production of the Reactive Thinning Agent Adduct

Analogously to Example 2, 84.7 parts phenyl glycidyl ether and 122.4 parts para-t-butyl phenyl glycidyl ether are converted with 320 parts TETA (ratio of epoxy:amine:1:2 mol or 1:12 equivalents). The secondary reaction is carried out for 2 h at 80° C. Subsequently the distillation of the excess amine is carried out at 250° C. and 50 mbar. The obtained final product has a viscosity at 25° C. of 10000 mPas, an amine equivalent of 68 g/equ. and a color number according to Gardner of <3.

Example 4
Formulation of the Curing Agent

To a mixture of 336 parts emulsifier component from Example 1, 367.5 parts of the adduct from Example 2 and 367.5 parts of the adduct from Example 3 are added successively at 90° C. 114 parts phenyl glycidyl ether and 75 parts p-tert. butylphenyl glycidyl ether. After a reaction time of 2 h at 90° C., 700 parts dist. water are added. The obtained curing means has a viscosity at 25° C. of 5000 mPas, an amine equivalent of 200 g/equ. and a color number after Gardner <3.

Example 5
Production and Application of a Ready-to-use Emulsion

After mixing 32 parts of the curing means with 31 parts of a reactive-thinned liquid epoxy resin (basis bisphenol A, epoxy equivalent 190 g/equ.) and 37 parts water, this mixture has a workable life at ambient temperature of approximately 120 minutes. When a thin layer of this emulsion is applied onto a substrate, rapid film formation takes place. The end of the workable life is clearly detectable by a strong increase of the viscosity. The cured film has a lustrous brightness (175% at a measuring angle of 20°). The pendulum hardness (after König) after 24 h is 100 s at ambient temperature, and after 7 days it is 200 s at ambient temperature.

What is claimed is:

1. A curing agent for epoxy resins comprises:
   a) a reaction product of at least one polyalkylene polyether monoamine and/or polyamine having a molecular weight of from 148 to 5000 with a polyepoxide and, optionally, a monoepoxide, in a ratio of amine hydrogen, optionally remaining after reaction with the monoepoxide, and epoxide groups of the polyepoxide of from 1:1.4 to 1:6 to obtain an epoxide group-containing precursor, the precursor further reacted with a primary monoamine and/or a primary or secondary polyamine in at least a 10% molar excess relative to the epoxide groups of the precursor, the reaction product being substantially free of non-reacted amines;
   b) an amine-terminated adduct of an epoxy resin and a primary monoamine and/or a primary or secondary polyamine being substantially free of non-reacted amines; and
   c) an amine-terminated adduct of an epoxide group-containing reactive thinning agent and a primary monoamine and/or a primary or secondary polyamine being substantially free of non-reacted amines.

2. A curing agent of claim 1, wherein the components a), b) and c) are in a ratio of 10–60:5–85:5–85 by weight.

3. The curing agent of claim 1, wherein the polyalkylene polyether monoamine and/or polyamine is based on ethylene oxide or butylene oxide.

4. A curing agent of claim 1 in the form of an emulsion or solution.

5. A method for the production of the curing agent of claim 1 comprising:
   i) mixing and reacting the polyalkylene polyether monoamine(s) and/or polyamine(s) with the polyepoxide, and optionally, the monoepoxide, to obtain the epoxide group-containing precusor,
   ii) further reacting the precursor with the primary monoamine and/or a primary or secondary polyamine to form a mixture containing the reaction product,
   iii) distilling the mixture to remove non-reacted monoamines and/or polyamines, and
   iv) mixing the reaction product with amine-terminated adducts b) and c) to form the curing agent.

6. The method of claim 5, wherein the polyalkylene polyether monoamine and/or polyamine is based on ethylene oxide or butylene oxide.

7. A method for the production of the curing agent of claim 1 comprising:
   i) mixing and reacting the polyalkylene polyether monoamine(s) and/or polyamine(s) with the polyepoxide, and optionally, the monoepoxide, to obtain the epoxide group-containing precusor,
   ii) further reacting the precursor with the primary monoamine and/or a primary or secondary polyamine to form a mixture containing the reaction product,
   iii) distilling the mixture to remove non-reacted monoamines and/or polyamines,
   iv) mixing the reaction product with amine-terminated adducts b) and c) to form a mixture containing the curing agent, and
   v) distilling the mixture the remove non-reacted monoamines and/or polyamines.

* * * * *